United States Patent [19]
Poetsch et al.

[11] Patent Number: 6,034,720
[45] Date of Patent: Mar. 7, 2000

[54] METHOD AND ARRANGEMENT FOR MANUFACTURING A HIGH-RESOLUTION DIGITAL FILM MASTER

[75] Inventors: Dieter Poetsch, Ober-Ramstadt; Mike Christmann, Lierschied; Reinhard Fach, Greisheim; Michael Brösamle, Weiterstadt, all of Germany

[73] Assignee: U.S. Philips Corporation, New York, N.Y.

[21] Appl. No.: 08/824,395

[22] Filed: Mar. 26, 1997

[30]     Foreign Application Priority Data

Mar. 29, 1996 [DE] Germany ................ 196 12 530

[51] Int. Cl.⁷ .................................................... H04N 7/18
[52] U.S. Cl. ......................................... 348/97; 348/441
[58] Field of Search ........................... 348/96, 97, 441

[56]     References Cited

U.S. PATENT DOCUMENTS

| 4,872,054 | 10/1989 | Gray | 348/441 |
| 5,488,410 | 1/1996 | Lieberfarb | 348/441 |
| 5,841,512 | 11/1998 | Goodhill | 348/441 |
| 5,881,205 | 3/1999 | Andrew | 348/441 |

FOREIGN PATENT DOCUMENTS 29519279  3/1996  Germany ................ H04N 9/11

OTHER PUBLICATIONS

"Restaurierung Von Filmen Mit Elektronischen Methoden" pp. 484–487 of De Magazine FKT Sep. 1995.
"Elektronische Restaurierung Von Filmen Fur Die Fernsehwiedergabe" on p. 488 Of De Magazine FKT Sep. 1995.
"Vom Analogen Filmbtaster Zur Digitalen Multistandard–Nachebearbeitung" By D. Poetsch In De Magazine FKT Sep. 1995, pp. 502–509.

*Primary Examiner*—Bryan Tung
*Attorney, Agent, or Firm*—Gregory L. Thorne

[57]     ABSTRACT

A method and an arrangement for manufacturing a high-resolution digital master for filing cinematographic films and their conversion into different TV and multimedia standards, in which the overall picture and sound information associated with the cinematographic film is high-resolution scanned, digitized and stored. For creating a high-quality electronic duplicate of a film master for the purpose of document-secure filing or for manufacturing different TV and multimedia versions, picture and sound data prescriptions derived from the film for processing steps and parameters associated with the corresponding film frames are additionally stored.

19 Claims, 1 Drawing Sheet

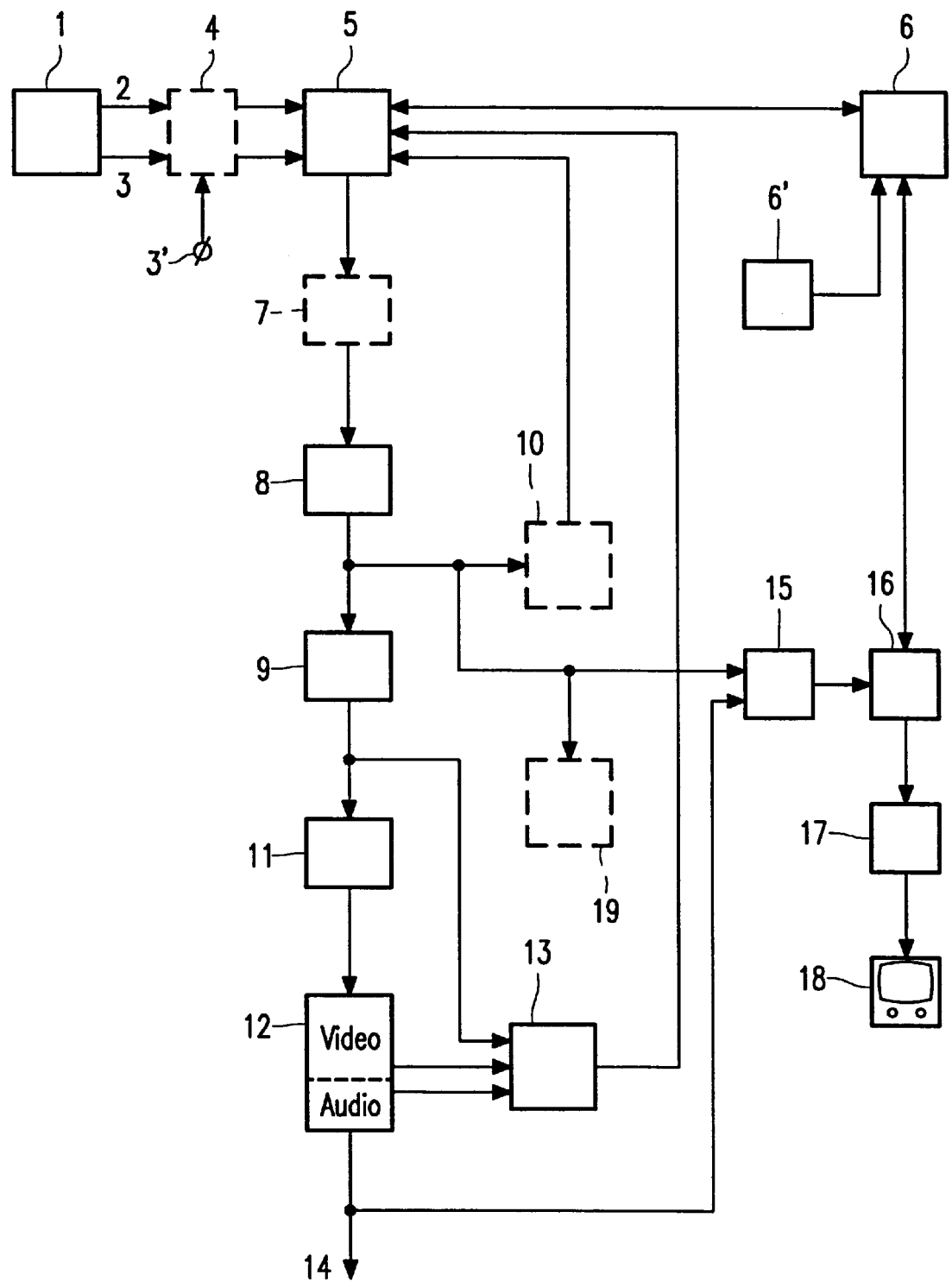

METHOD AND ARRANGEMENT FOR MANUFACTURING A HIGH-RESOLUTION DIGITAL FILM MASTER

BACKGROUND OF THE INVENTION

1. Field of the Invention

The invention relates to a method of manufacturing a high-resolution digital master for filing cinematographic films and their conversion into different TV and multimedia standards, in which, method, the overall picture and sound information associated with the cinematographic film is high-resolution scanned, digitized and stored.

2. Description of the Related Art

Currently, a high-resolution digital film master is only manufactured on film in exceptional cases for the purpose of restoration and exposure, cf. J. Ristow "Restaurierung von Filmen mit elektronischen Methoden" pp. 484 etc. of DE Magazine FKT 9/1995. The so-called master-copying of films for TV applications is nowadays often realized by direct video-copying of films on magnetic tapes in the respective TV standards and picture formats while using color correction, cf., for example, the article "Elektronische Restaurierung von Filmen für die Fernsehwiedergabe" on page 488 of DE Magazine FKT 9/1995.

However, these methods have the drawback that the quality only corresponds to the respective processing operation, the TV standard and the format of the magnetic recording. Moreover, a new re-recording of the film must be performed for each different TV standard (625 lines or 525 lines; PAL, NTSC and for each picture format 16:9 or 4:3, cinemascope, letterbox, etc.) which is very time-consuming. Moreover, if the film is only available as an uncut negative, a new cutting operation must additionally be performed on the video film. As the original film without real restoration is used as a basic material, the result is dependent on the condition of this film.

To avoid these drawbacks, a proposal for filing and film master-copying, using color correction and subsequent conversion for marketing films in different TV and multimedia formats, is made in the article "Vom analogen Filmabtaster zur digitalen Multistandard-Nachbearbeitung" by D. Poetsch in DE Magazine FKT 9/1995, pp. 502 etc., particularly page 508. The entire motion film of 90 minutes can be stored, after a loss-free compression, on a disk server and re-recorded on a tape store for long-time filing. During evaluation, the picture data are used, after decompression and format conversion, for tape recording or for transmission.

An arrangement for storing frames of a cinematographic film by means of a device for pixel-sequential conversion of the entire picture contents of the film frames without limitation into a digital data signal and a storage device for recording and reproducing the digital data signals is known from DE 295 19 279.8, in which, for real-time capacity, a parallel data signal processing and transmission is provided. For, for example, filing purposes, an intermediate standard of the digitized film which is independent of the television standard should then be realized for, for example filing purposes.

SUMMARY OF THE INVENTION

It is an object of the invention to provide a method of the type described in the opening paragraph with which an electronic duplicate of high quality is derived from cinematographic films and can be filed in a document-reliable way. By means of a restoration of the cinematographic film, the film master should correspond to the original condition of the film at the time of manufacture. It should be possible to manufacture different TV and multimedia versions of the digital master at a later stage. A re-recording on film should also be possible.

This object is solved in that, in addition to the digital picture and sound data, prescriptions for processing steps and parameters associated with the corresponding film frames are stored and used for manufacturing different versions of the digitized film.

The invention has the advantage that the desired different TV and multimedia versions can be automatically created by means of the required processing steps under the control of the stored prescriptions. As a result, an essentially smaller memory space is required as compared with filing a plurality of different versions, because only the original and the prescriptions must be stored. It is further advantageous that the film original is not changed by the different versions. Moreover, loss-free copying of the master is possible in this case. A further advantage is that the electronic duplicate of the original film is not submitted to any further alteration processes.

It is particularly advantageous that a highly compressed set of data is derived from the data of the digitized film, which set of data serves for a quick examination of the filed master and the different versions.

BRIEF DESCRIPTION OF THE DRAWINGS

The sole FIGURE shows, in block diagram form, an arrangement for manufacturing a high-resolution digital film master, in accordance with the invention.

DESCRIPTION OF THE PREFERRED EMBODIMENTS

These and other aspects of the invention will be apparent from and elucidated with reference to the embodiments described hereinafter.

In the sole FIGURE, a cinematographic film is electronically scanned in a high-resolution real-time film scanner 1, in which the optical information of the film frames is converted into electric picture signals which are subsequently changed into digital data signals. The sound information associated with the film frames is also scanned, digitized and changed into a sound data signal. These picture and sound data signals are derived at the outputs 2 and 3 of the film scanner 1 and—possibly via a loss-free data compression stage 4—applied to a disc memory 5 (disk server). The compression stage 4 has a further input 3' to which a further sound data signal, for example, from a magnetic recording device can be applied. The disk server 5 is used for temporary storage of a film master, i.e., an original film, from which film copies or video tape copies can be made. The disk server 5 communicates with a further storage device 6 referred to as file store in which a multitude of film masters can be stored or filed. A device 6' associated with the file store 6 provides the possibility of employing administration dates for filing, for example, additional data (such as titles), filing criteria (such as cross-references), security codes and short abstracts of the films.

For restoration of faulty or damaged films, a device 8 for picture and sound restoration is connected to a further output of the disk server 5—possibly via a decompression stage 7. With this device, the picture and sound information of the film stored on the disk server 5 can be restored frame by frame or scene by scene. A format converter 9, for converting the digital data signals into TV or multimedia signals, is connected to the output of this device 8. The output of the device 8 is further connected to a further input of the disk server 5—possibly via a further loss-free data compression stage 10. Thus, the restored film master may be temporarily stored once again, if necessary.

A further disk server 11 for frame-sequential temporary storage and determination of the film sections to be corrected is connected to the output of the format converter 9. Subsequently, a device 12 is provided for performing different processing steps such as, for example, color correction of individual scenes for the converted formats, possible frame size alternations and sound- processing steps, for example, multilingual versions, sound effects and music fades-in. These processing steps are stored in a device 13 for creating lists of processing prescriptions. The output 14 of the device 12 constitutes the output of the arrangement at which the desired TV and multimedia signals can be derived. A further input of the device 13 is connected to the output of the format converter 9. The output of the device 13 is connected to an additional input of the disk server 5.

Both the output of the device 8 for fault restoration and the output 14 of the device 12 are connected to inputs of a compression device 15 for deriving highly compressed sets of data. The output of the compression device 15 is connected to an input of a browsing server 16 with which a quick examination of the restored film and of a video film to be transmitted is possible. A further input of the browsing server 16 is connected to the storage device 6 so that also the filed browsing master can be applied to the browsing server 16 for quick examination. A monitor 18 for picture and sound reproduction for a quick examination of the respective film material is connected to an output of the browsing server 16 via a decompression stage 17.

A film recorder 19 may be connected to the output of the device 8 for fault restoration, with which recorder a new film can be recorded on a cinematographic film strip as a restored copy of the film master.

The re-recording of the picture and sound data signals as well as the additional information for film processing and security codes on the storage device 6 is advantageous because a change or falsification of the data signals to be filed is prevented, thus securing the genuineness of the documents. A re-recording of the data signals from the storage device 6 or the disk server 5 with the additional information which perform the stored processes (such as format selection, color correction, TV standard, etc.) on the data fully automatically, provides the possibility of supplying a complete video product from the output 14.

We claim:

1. A method of manufacturing a high-resolution digital master for filing cinematographic films and their conversion into different TV and multimedia standards, said method comprising the steps:

high-resolution scanning the overall picture and sound information associated with the cinematographic film;

digitizing the scanned picture and sound information; and storing the digitized picture and sound information, characterized in that, in addition to the digital picture and sound data, said method further comprises the step:

storing prescriptions for processing steps and parameters associated with the corresponding film frames together with the stored digitized picture and sound information; and using the stored prescriptions for manufacturing different versions of the digitized film.

2. A method as claimed in claim 1, characterized in that said method further comprises the step:

performing a digital electronic restoration of the film prior to storing said picture and sound information in the case of occurring faults.

3. A method as claimed in claim 2, characterized in that said method further comprises the step:

performing an exposure on film material after restoration of faulty film sections for creating an original-true master.

4. A method as claimed in claim 1, characterized in that, for each film version, said method further comprises the step:

determining the prescriptions for processing steps and parameters with reference to the digital master.

5. A method as claimed in claim 1, characterized in that said method further comprises the step:

deriving a highly compressed set of data as a browsing master from the data of the digitized film.

6. A method as claimed in claim 5, characterized in that said method further comprises the step:

performing a quick search in the browsing master and/or different versions of the film for a quick examination of the filed film material.

7. A method as claimed in claim 1, characterized in that said method further comprises the step:

creating highly compressed versions of the digitized film by performing the processing step prescriptions.

8. A method as claimed in claim 1, characterized in that, in addition to the picture and sound data and the prescriptions for the processing steps and parameters, said method further comprises the step:

storing at least one of further additional information, filing criteria, security codes and short abstracts for an administrative system, with the association of masters, browsing masters and the versions of a given film in a file store when filing the cinematographic films.

9. A method as claimed in claim 7, characterized in that said method further comprises the step:

creating editing lists of the film sections which are taken from the file store for composing the different versions.

10. A method as claimed in claim 1, characterized in that said method further comprises the step:

creating the different versions of the digitized films while performing the processing step prescriptions.

11. An arrangement for manufacturing a high-resolution digital master for filing cinematographic films and their conversion into different TV and multimedia standards, characterized in that said arrangement comprises:

a device for pixel-sequential conversion of the overall picture contents of film frames into a digital picture data signal and associated sound information into digital sound data signals;

a first storage device for recording and reproducing digital data signals, said first storage device receiving the digital picture data signal and the digital sound data signals for temporary storage;

a second storage device for recording and reproducing digital data signals, said second storage device receiving the digital picture data signal and the digital sound data signals supplied by the first storage device, and prescriptions for processing steps and parameters for filing purposes;

a device for picture and sound restoration connected to an output of the first storage device;

a format converter coupled to an output of said picture and sound restoration device for converting restored digital data signals into TV or multimedia signals;

a device for performing different processing steps for picture and sound coupled to an output of said format converter, said different processing performing device having an output for providing processed picture and sound signals; and a device for creating lists of processing prescriptions having an output coupled to an input of the first storage device, said list creating device being connected to the output of the format converter and to a further output of the different processing performing device.

12. An arrangement for manufacturing a high-resolution digital master for filing cinematographic films and their conversion into different TV and multimedia standards as claimed in claim 11, characterized in that said arrangement further comprises a device for generating filing data including additional data, filing criteria, security codes and abstracts, said filing data generating device being connected to a further input of the second storage device.

13. An arrangement for manufacturing a high-resolution digital master for filing cinematographic films and their conversion into different TV and multimedia standards as claimed in claim 11, characterized in that said arrangement further comprises:

a compression device for deriving highly compressed sets of data, said compression device being connected to the output of the picture and sound restoration device and to the output of the different processing performing device;

a browsing server connected to an output of the compression device, said browsing server being also connected to the second storage device;

a decompression stage having an input coupled to an output of the browsing server; and a picture and sound reproduction device coupled to an output of the decompression stage.

14. An arrangement for manufacturing a high-resolution digital master for filing cinematographic films and their conversion into different TV and multimedia standards as claimed in claim 11, characterized in that said arrangement further comprises a film recorder connected to the output of the picture and sound restoration device.

15. An arrangement for manufacturing a high-resolution digital master for filing cinematographic films and their conversion into different TV and multimedia standards as claimed in claim 11, characterized in that said arrangement further comprises:

a compression stage for loss-free compression of the data signal coupled between the device for converting the film frames into data signals and the first storage device; and a decompression stage coupled between the first storage device and the picture and sound restoration device.

16. An arrangement for manufacturing a high-resolution digital master for filing cinematographic films and their conversion into different TV and multimedia standards as claimed in claim 11, characterized in that said arrangement further comprises a further compression stage for loss-free compression of the data signals coupled between the output of the picture and sound restoration device and an input of the first storage device.

17. A method of manufacturing a high-resolution digital master for filing cinematographic films and their conversion into different TV and multimedia standards, said method comprising:

high-resolution scanning the overall picture and sound information associated with the cinematographic film;

digitizing the scanned picture and sound information;

performing a digital electronic restoration of the film prior to storing said picture and sound information in the case of occurring faults;

storing at least one of the digitized picture and sound information, and the digital electronic restoration of the film, storing prescriptions for processing steps and parameters associated with the corresponding film frames; and performing an exposure on film material after restoration of faulty film sections for creating an original-true master.

18. A method of manufacturing a high-resolution digital master for filing cinematographic films and their conversion into different TV and multimedia standards, said method comprising:

high-resolution scanning the overall picture and sound information associated with the cinematographic film;

digitizing the scanned picture and sound information; and storing the digitized picture and sound information, wherein, in addition to the digital picture and sound data, said method further comprises:

storing prescriptions for processing steps and parameters associated with the corresponding film frames;

storing further additional information, filing criteria, security codes and short abstracts for an administrative system, with the association of masters, browsing masters and the versions of a given film in a file store when filing the cinematographic films.

19. A method as claimed in claim 18, comprising:

using the stored prescriptions for manufacturing different versions of the digitized film; and creating editing lists of the film sections which are taken from the file store for composing the different versions.

* * * * *